(12) United States Patent
Yerli (10) Patent No.: US 11,101,874 B1
(45) Date of Patent: Aug. 24, 2021

(54) METHOD AND SYSTEM FOR PROVIDING IN-FLIGHT NETWORK COMMUNICATIONS

(71) Applicant: TMRW FOUNDATION IP S. À R.L., Luxembourg (LU)

(72) Inventor: Cevat Yerli, Frankfurt am Main (DE)

(73) Assignee: TMRW FOUNDATION IP S. À R.L., Luxembourg (LU)

( * ) Notice: Subject to any disclaimer, the term of this patent is extended or adjusted under 35 U.S.C. 154(b) by 0 days.

(21) Appl. No.: 17/164,701

(22) Filed: Feb. 1, 2021

(51) Int. Cl.
| | |
|---|---|
| *H04W 4/00* | (2018.01) |
| *H04B 7/185* | (2006.01) |
| *H04L 29/08* | (2006.01) |
| *H04W 12/06* | (2021.01) |
| *H04W 84/12* | (2009.01) |

(52) U.S. Cl.
CPC ......... *H04B 7/18506* (2013.01); *H04L 67/12* (2013.01); *H04W 12/06* (2013.01); *H04W 84/12* (2013.01)

(58) Field of Classification Search
CPC .... H04B 7/18506; H04L 67/12; H04W 12/06; H04W 84/12
See application file for complete search history.

(56) References Cited

U.S. PATENT DOCUMENTS

| | | | |
|---|---|---|---|
| 7,454,203 B2 | 11/2008 | Levitan | |
| 7,715,838 B2 | 5/2010 | Swensen et al. | |
| 8,699,403 B2 | 4/2014 | Lynch et al. | |
| 8,700,032 B2 | 4/2014 | Redford et al. | |
| 8,782,738 B2 | 7/2014 | Lynch et al. | |
| 8,922,436 B2 * | 12/2014 | Stone | H01Q 3/22 343/701 |
| 9,467,828 B2 * | 10/2016 | Lauer | H04W 8/26 |
| 9,490,891 B2 | 11/2016 | Frerking et al. | |
| 9,973,534 B2 * | 5/2018 | Mahaffey | H04L 63/105 |
| 10,051,652 B2 | 8/2018 | Demange et al. | |
| 10,284,373 B2 * | 5/2019 | Faruque | H04K 3/827 |
| 10,461,842 B2 * | 10/2019 | Lu | H04B 7/18506 |
| 10,523,634 B2 * | 12/2019 | Haak | G06F 21/30 |
| 2016/0352412 A1 | 12/2016 | Di Costanzo et al. | |
| 2019/0379584 A1 | 12/2019 | Fischer et al. | |

* cited by examiner

*Primary Examiner* — Amancio Gonzalez
(74) *Attorney, Agent, or Firm* — Christensen O'Connor Johnson Kindness PLLC (57) ABSTRACT

A method for providing aircraft network communications is provided. The method includes checking, by an onboard server of an aircraft, for aircraft network connection readiness; receiving, by the onboard server, a connection request from one or more user devices on the aircraft that subsequently and periodically continue scanning for aircraft network connection readiness; in response to finding, by the onboard server, a secure connection to an aircraft communications network based on one or more connection rules, connecting the onboard server to the aircraft communications network; notifying the one or more user devices that a network is available; authenticating the one or more user devices; connecting the one or more user devices to the aircraft network; monitoring network connection status; and in response to determining that the network connection status is insecure based on the one or more connection rules, disconnecting the onboard server from the aircraft communications network.

20 Claims, 8 Drawing Sheets

METHOD AND SYSTEM FOR PROVIDING IN-FLIGHT NETWORK COMMUNICATIONS

BACKGROUND

In-flight entertainment has evolved from providing media content through shared video screens to individual seatback screens providing different types of entertainment to be selected from a finite selection of available movies and/or other programming. These solutions relied on media content stored on the aircraft itself.

More recently, local area network communication services (e.g., wireless local-area network (WLAN) based on the Institute of Electrical and Electronics Engineers' 802.11 standards). Terrestrial equipment may provide network communication services to user devices while the aircraft is on the ground, whereas aircraft equipment may provide network communication services via a satellite communications system to a user while in flight, enabling the delivery of media content through different types of applications along with email and web-browsing services.

Nevertheless, the connection process of the aircraft network communication services may not be seamless. For example, users may be required to first connect and authenticate before takeoff, manually (or automatically) disconnect during the takeoff, and then manually reconnect after receiving a notification from the aircraft crew that that connecting is again safe, making the connection process cumbersome for users. Thus, what is desired are systems and methods enabling a seamless in-flight network connection.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method for providing aircraft network communications is provided. The method includes checking, by an onboard server of an aircraft, for aircraft network connection readiness. The method also includes receiving, by the onboard server, a connection request from one or more user devices on the aircraft that subsequently and periodically continue scanning for aircraft network connection readiness. The method also includes, in response to finding, by the onboard server, a secure connection to an aircraft communications network based on one or more connection rules connecting the onboard server to the aircraft communications network by using one or more long-distance antennas to communicate with one or more ground servers via a satellite communications system or an air-to-ground communications system, notifying the one or more user devices that a network is available, receiving connection approval from the one or more user devices, authenticating the one or more user devices, connecting the one or more user devices to the aircraft network, monitoring network connection status, and in response to determining that the network connection status is insecure based on the one or more connection rules, disconnecting the onboard server from the aircraft communications network.

In some embodiments, the method may also include, after disconnecting the onboard server from the aircraft communications network checking for network connection readiness, in response to again finding a secure connection to the aircraft communications network based on the one or more connection rules, connecting the onboard server and one or more user devices to the aircraft communications network, continuing monitoring status of the connection to the aircraft communications network, and in response to determining that the network connection status is again insecure based on the one or more connection rules, disconnecting the onboard server from the aircraft communications network again. In some embodiments, the one or more connection rules include at least one of a speed threshold, an altitude threshold, an air pressure threshold, and a location threshold measured by corresponding sensing devices.

In some embodiments, the method further includes creating a user profile associated with an airline of the aircraft, and storing the user profile in the one or more ground servers for authentication purposes.

In some embodiments, receiving the connection request from the one or more user devices on the aircraft includes receiving a request for suspending radio-frequency signal transmission by the user device except for communication with the aircraft network.

In some embodiments, the one or more connection rules cause the onboard server to initially connect to the aircraft communications network before takeoff to enable a corresponding connection of the one or more user devices to the aircraft communications network, and to disconnect from the aircraft communications network during takeoff and landing. In some embodiments, connecting the one or more user devices to the aircraft communications network includes allocating an amount of bandwidth to the one or more user devices based on corresponding user profiles.

In some embodiments, creating the user profile includes one or more of inputting user login data, flight ticket scanning, finger print scanning, face scanning, and automatic secure user device profile creation and verification. In some embodiments, a digital version of a flight ticket is stored in a digital wallet, and the one or more ground servers check the digital version of the flight ticket to grant network connection access.

In some embodiments, creating the user profile includes automatic secure user device profile creation, and the automatic secure user device profile creation includes using, by the one or more ground servers, identifying information of the user device, where the identifying information of the user device includes one or more of subscriber identity module (SIM) information, a mobile equipment identifier (MEID), and an International Mobile Equipment Identity (IMEI).

In some embodiments, the connection request and the request for suspending radio-frequency signal transmission is sent by the use of a standard configuration option installed by default on the one or more user devices. In some embodiments, the connection request and the request for suspending radio-frequency signal transmission is sent by a downloadable application installed on the one or more user devices.

In one aspect, an onboard network system is provided. The onboard network system is installed on an aircraft for providing aircraft network communications. The onboard network system includes one or more onboard antennas. The onboard network system also includes an onboard server. The onboard network system also includes one or more networking devices. The onboard server is configured to perform actions comprising: checking for aircraft network connection readiness; receiving a connection request from one or more user devices on the aircraft through the one or more networking devices, the one or more user devices subsequently and periodically continuing the scanning of aircraft network connection readiness; in response to detecting that a connection to an aircraft network is ready connecting the onboard server to a communication system, authenticating the one or more user devices, and connecting the one or more user devices to an aircraft communications network via the communication system. The actions further comprise, in response to detecting that a network status of the aircraft network is insecure, disconnecting from the aircraft communications network.

In some embodiments, the actions further comprise, after disconnecting from the aircraft communications network again checking for network connection readiness; in response to determining that the aircraft network is again ready for connection connecting the onboard server and the one or more user devices to the aircraft communications network, continuing to monitor the network status; and in response to detecting that the network status is again insecure, disconnecting again from the aircraft communications network.

In some embodiments, checking for aircraft network connection readiness is performed based on one or more connection rules including at least one of a speed threshold, an altitude threshold, or a location threshold measured by corresponding sensing devices.

In some embodiments, the actions further comprise creating a user profile associated with an airline of the aircraft, and storing the user profile in one or more ground servers for authentication purposes.

In some embodiments, receiving the connection request from the one or more user devices on the aircraft includes receiving a request for suspending radio-frequency signal transmission by the user device except for communication with the onboard network system.

In some embodiments, the actions further comprise, based on the one or more connection rules, initially connecting to one or more ground servers before takeoff to enable a corresponding connection of the one or more user devices to the aircraft communications network, and subsequently disconnecting from the one or more ground servers during takeoff and landing.

In some embodiments, creating the user profile includes one or more of inputting user login data, flight ticket scanning, finger print scanning, face scanning, or automatic secure user device profile creation and verification.

In some embodiments, creating the user profile includes automatic secure user device profile creation, and the secure user device profile creation includes using, by the one or more ground servers, identifying information of the user device, where the identifying information of the user device includes one or more of subscriber identity module (SIM) information, a mobile equipment identifier (MEID), and an International Mobile Equipment Identity (IMEI).

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Some of the drawbacks disclosed in the background are solved through a system and method for providing in-flight network communications of the current disclosure. The system and method enable a secure and automatized connection and disconnection of an onboard network system through an air-to-ground communications system and/or a satellite communications system to ground servers providing access to the communications network. Users may create a profile for connecting to the airline network, and then request network connection a single time. The user device may thereafter communicate to an onboard server and scan for the aircraft communication network until the network is ready for connection. The user may then receive a notification to approve the connection, and may need to authenticate the connection a single time. Afterward, the onboard servers may disconnect and subsequently reconnect to the ground servers and accordingly disconnect and/or disconnect the user devices based on connection rules stored on the ground servers and shared to the onboard servers. Thus, users may not need to wait until the aircraft crew notifies the passengers of the readability of the connection, but may rather connect seamlessly, automatically and in a secure way.

Figure 1:
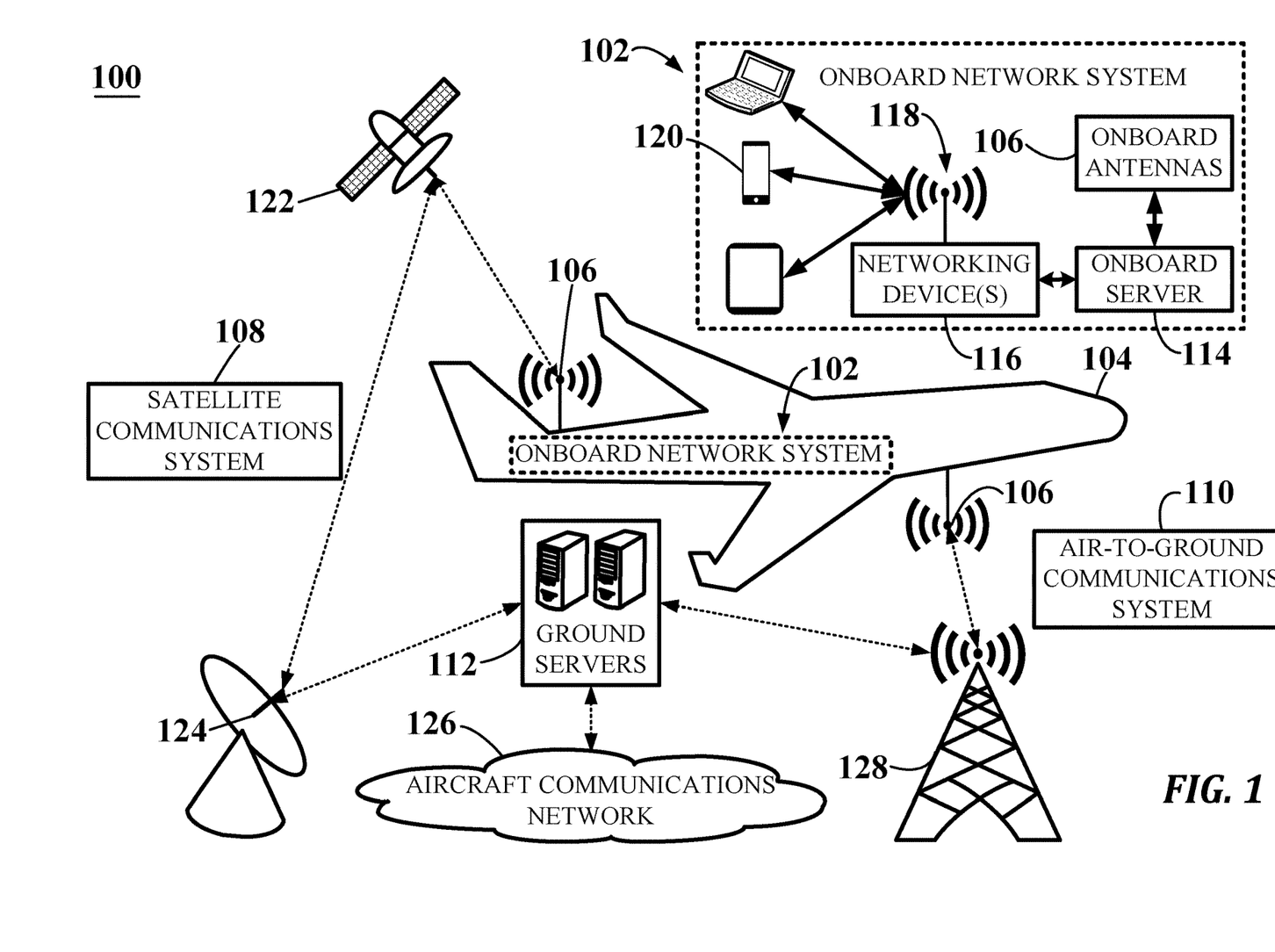
FIG. 1 depicts a schematic illustration of a non-limiting example embodiment of a system 100 for providing in-flight network communications, according to various aspects of the present disclosure.

FIG. 1 depicts a schematic illustration of a non-limiting example embodiment of a system 100 for providing in-flight network communications, according to various aspects of the present disclosure. System 100 comprises an onboard network system 102 installed on at least one aircraft 104, which connects to a network (e.g., the Internet) through one or more long-distance antennae 106 employing a satellite communications system 108, an air-to-ground communications system 110, or alternating between both satellite communications system 108 and air-to-ground communications system 110, providing access to ground servers 112 that enable access to the aircraft communications network 126. The aircraft communications network 126 facilitates at least one mode of communication such as interconnect, dispatch, email, short messaging services (SMS), multimedia messaging service (MMS) and data packet communications, amongst others. The onboard network system 102 comprises an onboard server 114 communicatively coupled to one or more networking devices 116 and to the onboard antennae 118, which provide network communications to one or more user devices 120.

The networking devices 116 may comprise a network router, and at least one aircraft access point which may be located in various parts of the aircraft cabin to provide network access to the one or more user devices 120. The network router may be a wireless router that serves as a mobile WiFi hotspot by providing signals from the onboard server 114 sent through the long-distance antenna 106, and which correspondingly provides network routing and switching functionalities. The WiFi connection provided on the aircraft may be a wireless 802.11 WiFi connection and may be provided to users for, e.g., an hourly or flat rate fee while in flight. The network router may, for example, act as a decoding device to convert digital communication signals from the onboard server 114 into analog output signals that may be transmitted via the one or more access points to the one or more user devices 120 in the cabin. In other examples, the network router may also act as an encoding device to convert analog input signals captured by the one or more access points sent from the one or more user devices 120 into digital communication signals for the onboard server 114.

The aircraft access point may be, for example, a small cell, a wireless access point, an in-flight entertainment system, or other user equipment or user equipment interface communicatively connected to the aircraft network through the router. The user devices 120 may include personal mobile smart phones or telephones, personal digital assistants, tablets, gaming systems, seatback displays, wearable devices, head-mounted displays, smart contact lenses, email devices, laptop computers, or other suitable equipment that may communicate to the networking device 116, and in turn be connected to the onboard server 114.

When using satellite communications system 108, the aircraft 104 communicates with a non-terrestrial relay point (e.g., satellite 122), which communicates signals from and to the ground servers 112 via a terrestrial relay point (e.g., satellite band signal transceiver 124). When using the air-to-ground communications system 110, the aircraft 104 communicates with a terrestrial relay point (e.g., cell tower 128), which communicates signals from and to the ground servers 112. In some embodiments, the terrestrial relay points may interface with a public switched telephone network (PSTN) and to one or more Internet service providers (ISPs) for providing communication services to the onboard network system 102. The aircraft 104 uses the long-distance antennae 106 to send signals to and receive signals from both the satellite communications system 108 and air-to-ground communications system 110.

The ground servers 112 are configured to monitor all satellite communications systems 108, air-to-ground communications systems 110, as well as associated aircraft 104, and to assign resources to them. These assignments are dynamic to accommodate aircraft movement and changes in aircraft schedules. The ground servers 112 may further manage a plurality of modules comprising aircraft connection rules, user device connection authorization, reservations, billing, and entertainment data, and may share one or more of said modules with the onboard servers 114. The ground servers 112 may connect through an aircraft communications network 126 to a plurality of web servers hosting content that may be delivered to the aircraft 104 through the onboard network system 102 for enjoyment of one or more users through corresponding user devices 120.

The onboard server 114 is configured to check, through the one or more long-distance antennae 106, for aircraft network connection readiness based on one or more connection rules. In parallel, previously or subsequently, the onboard server 114 may receive a connection request from the one or more user devices 120 aboard the aircraft 104 through the one or more networking devices 116, after which the one or more user devices 120 may subsequently and periodically continue the scanning of aircraft network connection until discovering an available aircraft communications network 126. When a network connection is ready, the onboard server 114 may notify, authenticate, and connect the one or more user devices 120 to the aircraft communications network 126 while monitoring the network status. If the network status is insecure, the onboard server 114 may disconnect from the ground servers 112, simultaneously disconnecting the one or more user devices 120.

In some embodiments, after disconnecting from the aircraft communications network 126 because of one or more connection rules, the onboard server 114 is further configured to check again for network connection readiness. If the aircraft communications network 126 is once more ready for connection, the onboard server 114 may reconnect, along with the one or more user devices 120, and continue monitoring the network, and if the network connection is again insecure or unsuitable based on the one or more connection rules, the onboard server 114 may finally disconnect from the aircraft communications network 126, simultaneously disconnecting the user devices 120. Thus, using the techniques described herein, users may not need to wait until the aircraft crew notifies the passengers of the readability of the connection, but may seamlessly, automatically and securely connect and disconnect, depending on network connection rules stored on the ground servers 112 and shared with the onboard servers 114.

Figure 2:
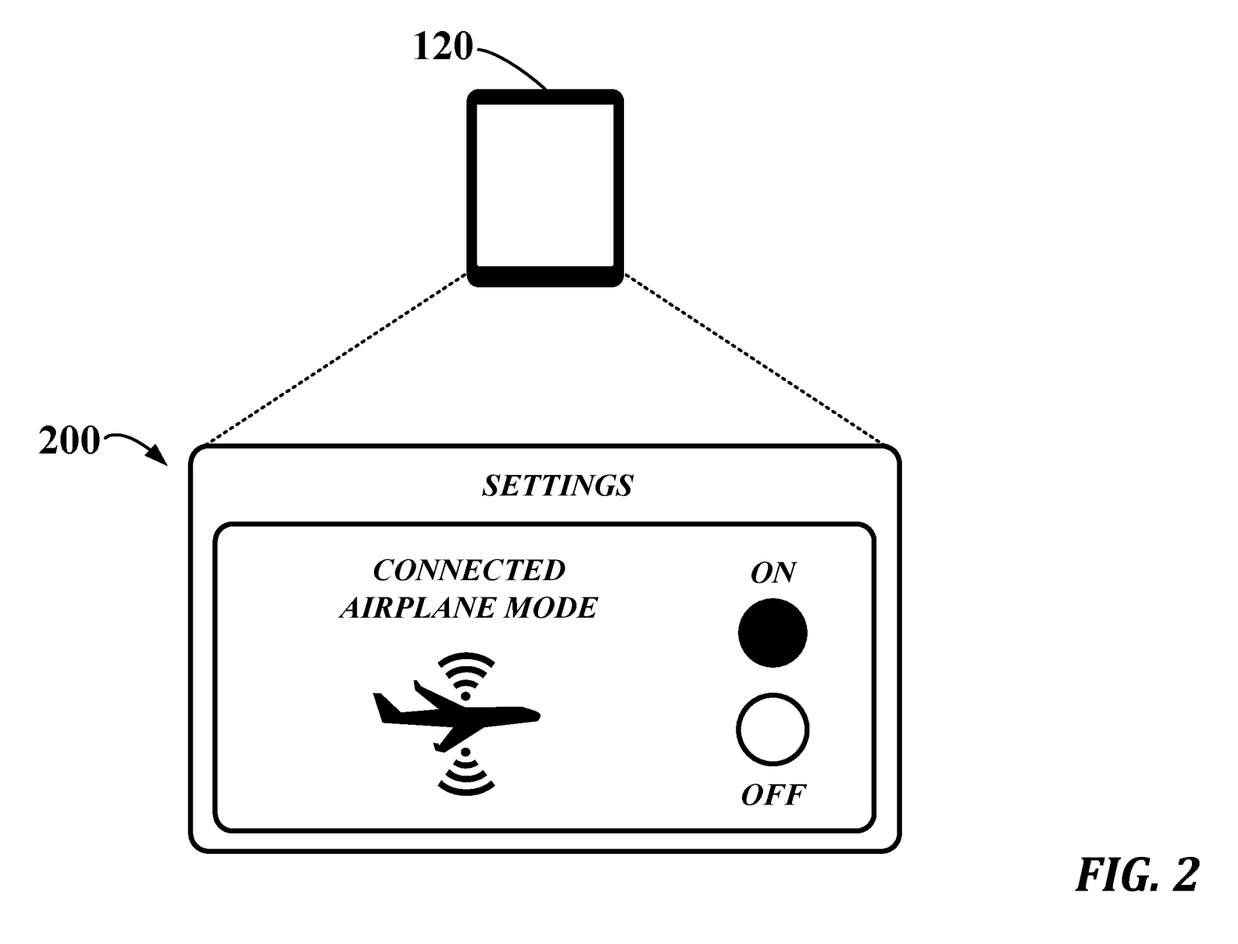
FIG. 2 depicts a schematic illustration of a non-limiting example embodiment of a visual representation of a user interface (UI) settings option for use in embodiments of the current disclosure.

FIG. 2 depicts a schematic illustration of a non-limiting example embodiment of a visual representation of a user interface (UI) settings option for use in embodiments of the current disclosure. Some elements of FIG. 2 may be similar to elements of FIG. 1, and thus may use the same or similar reference numbers.

In some embodiments, the UI settings option 200, illustrated in FIG. 2 as "connected airplane mode" may enable a user device 120 to initially scan for available networks, and after identifying the onboard network system 102, suspend radio-frequency signal transmission by the user device 120 except for network signals coming from the identified onboard network system 102. For example, the initial functionality provided through the UI settings option 200 of radio-frequency signal transmission signal suspension may be similar to the signal suspension provided through an "airplane mode" setting that is typically configured as a standard on-device application on modern user devices, but leaving an open communications channel for allowing data exchange through the identified onboard network system 102. Thus, after activating the illustrative "connected airplane mode" UI settings option 200, users may still select the available onboard network system 102 and, if the network is ready, begin the connection process.

In some embodiments, the UI settings option 200 is a standard configuration option installed by default on the one or more user devices 120. In other embodiments, the UI settings option 200 is a downloadable application installed on the one or more user devices 120.

Figure 3:
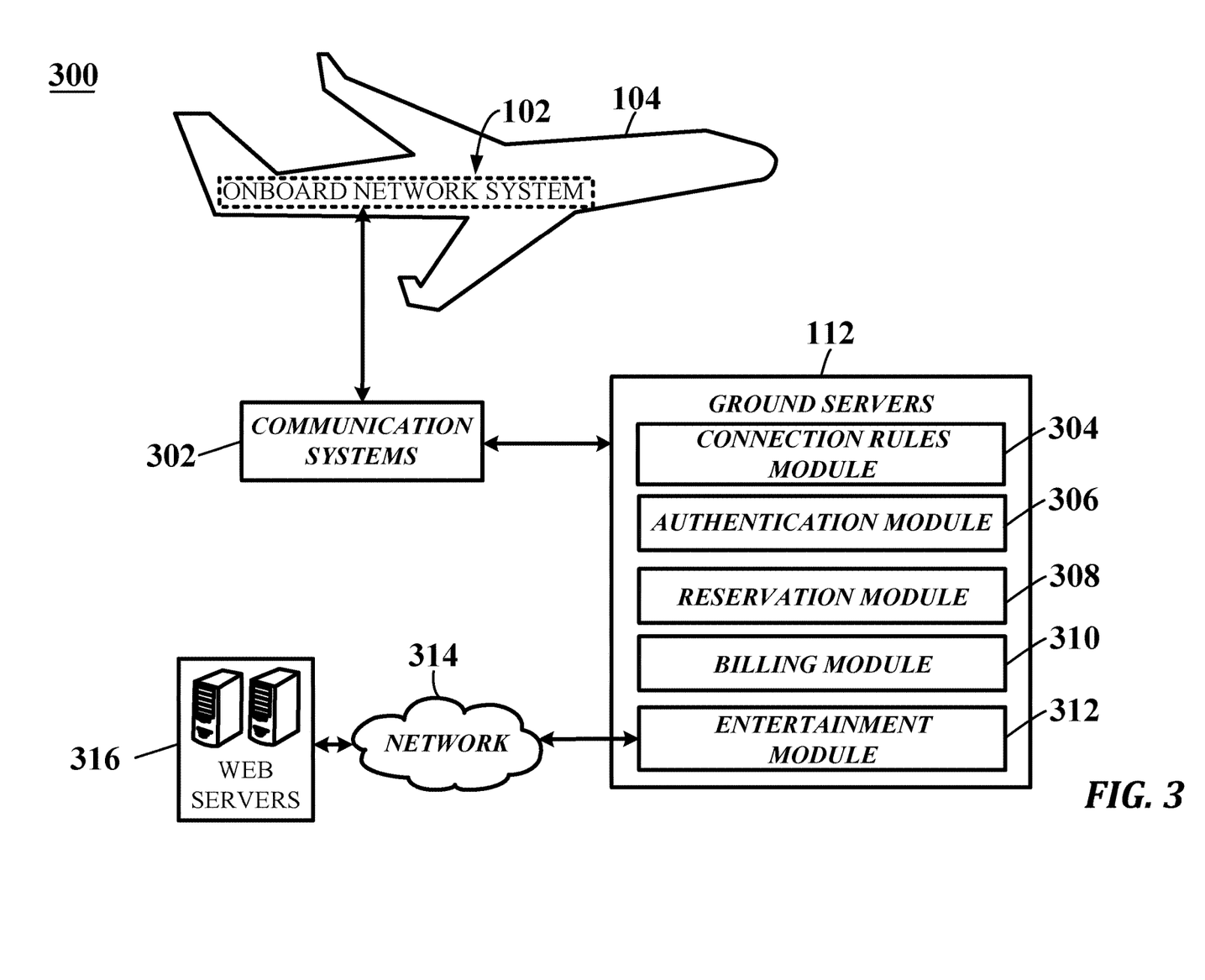
FIG. 3 depicts a schematic illustration of a non-limiting example embodiment of a system 300 detailing plurality of modules that may be stored in memory of the ground servers 112 for providing in-flight network communications and related services, according to various aspects of the present disclosure.

FIG. 3 depicts a schematic illustration of a non-limiting example embodiment of a system 300 detailing plurality of modules that may be stored in memory of the ground servers 112 for providing in-flight network communications and related services, according to various aspects of the present disclosure. Some elements of FIG. 3 may be similar to those of FIG. 1 and FIG. 2, and thus may use the same or similar reference numbers.

As used herein, the term "module" refers to logic embodied in hardware, firmware, or software instructions, which can be written in a programming language, including but not limited to one or more of C, C++, COBOL, JAVA™, PHP, Perl, HTML, CSS, JavaScript, VBScript, ASPX, Go, Python, Microsoft.NET™ languages such as C#, and/or the like. A module may be compiled into executable programs, written in interpreted programming languages, or embodied directly in electronic logic. Modules may be callable from other modules or from themselves. Generally, the modules described herein refer to logical components that can be merged with other modules, or can be divided into submodules. The modules can be stored in any type of computer-readable medium or computer storage device and be stored on and executed by one or more general purpose computers, thus creating a special purpose computer configured to provide the module.

System 300 may comprise a plurality of modules by which information may be shared through one or more communications systems 302 (e.g., the satellite communications system 108 and air-to-ground communications system 110 illustrated with reference to FIG. 1) with the onboard network system 102 aboard the one or more aircraft 104. The ground servers 112 may comprise more or fewer modules than those shown in FIG. 3, or may be replaced by other modules as appropriate. Likewise, some, more or all modules from the ground servers 112 may be shared during flight time or before takeoff with an onboard server 114 from the onboard network system 102 (e.g., onboard server 114). Example modules that may be hosted on the ground servers 112 comprise a connection rules module 304, an authentication module 306, a reservation module 308, a billing module 310 and an entertainment module 312.

The connection rules module 304 may provide rules for establishing a connection with the onboard network system 102 through the communications systems 302 in order to provide network access to the one or more user devices 120 aboard the aircraft 104. In some embodiments, the connection rules comprise one or more of a speed threshold, an air pressure threshold, an altitude threshold, or a location threshold measured by corresponding sensing devices of the aircraft 104. The corresponding sensing devices may comprise, for example, speedometers, barometers, altimeters, and GPS sensors. For example, based on one or more rules from the connection rules module 304, such as speed and location, the ground servers 112 may determine to connect to the onboard network system 102 before takeoff, enabling a corresponding connection of the one or more user devices 120 to the onboard network system 102. In another example, the ground servers 112 may determine to disconnect to the onboard network system 102, or to disable the onboard network system 102 for the onboard network systems 102 by disabling the corresponding networking devices 116, during takeoff; and to reestablish connection after reaching one or more of a predetermined speed, altitude, air pressure, or exceeding one or more of any other predetermined rule-based threshold.

The authentication module 306 stores user-related or user subscription-related data and instructions associated with each user device 120. The authentication module 306 serves the function of comparing the data provided by users through corresponding user devices 120 with the stored user data in order to authenticate the user devices 120 before granting access to network connections through the communications systems 302. In some embodiments, user authentication through the authentication module 306 comprises creating a user profile associated to an airline associated with the aircraft 104, which is stored on the ground servers 112 for authentication purposes or is connected to specific airline servers through a network 314.

Authentication data managed by the authentication module 306 may be added by any suitable technique, for example, by inputting user login data, flight ticket scanning, finger print scanning, or face scanning, amongst others. The authentication data may be further generated by an automatic secure user device profile creation by obtaining identifying information of the user device which may comprise information including, but not limited to, one or more of subscriber identity module (SIM) information, a mobile equipment identifier (MEID), and an international mobile equipment identity (IMEI). In some embodiments, the authentication data is added by accessing the web servers of the airline corresponding to the aircraft 104 and creating a profile comprising the requested authentication data.

Said access to the airline web servers and profile creation may be performed while the users are located at a predefined area with access to the network 314, such as at the corresponding gate, or when being aboard the aircraft 104. When a user requests a connection to the aircraft network, the onboard server 114 may retrieve the corresponding data from the authentication module 306 of the ground server 112 and compare the data to the created secure profile. In some embodiments, a digital version of the user's flight ticket may be stored in a digital wallet. The ground server 112 may check the digital version of the flight ticket in the digital wallet as part of the authentication process to grant network connection access.

In yet further embodiments, connecting the one or more user devices 120 further comprises, based on the created user profile, allocating an amount of bandwidth to the corresponding user device based on the associated user profile. For example, users that have decided to pay a higher fee for accessing the network, or who have a higher flight status (e.g., business class) or frequent flyer status may be allocated higher amounts of bandwidth than other users.

The reservation module 308 manages user ticketing information (e.g., seat number, passenger class (e.g., business or economy class), and passenger information) that may be shared with the authentication module 306 for authentication purposes. The billing module 310 may measure the amount of data consumed by each user device 120 and accordingly charge a corresponding fee associated to each user profile. The entertainment module 312 may work service requests (e.g., Internet searches, sound, video or image requests, etc.). The entertainment module 312 may connect through a network 314 such as the Internet to web servers 316 to request and receive Internet services and provide them to the corresponding user devices 120.

Figure 4A:
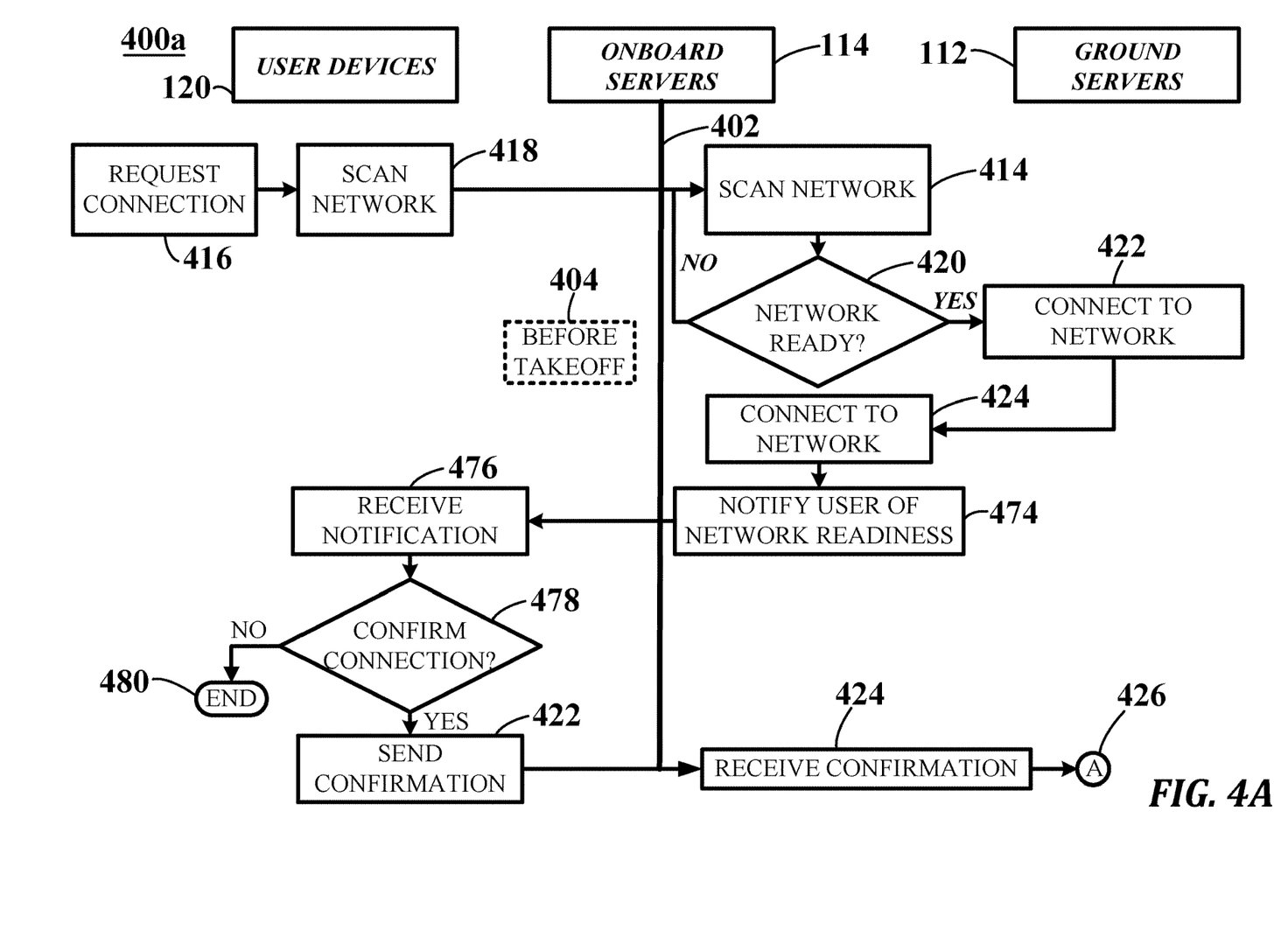
FIG. 4A—FIG. 4C depict a schematic illustration of a non-limiting example embodiment of a method represented by communication sequence diagrams 400*a-c* taking place between user devices 120 aboard an aircraft 104, onboard servers 114 and ground servers 112, according to various aspects of the present disclosure
Figure 4B:
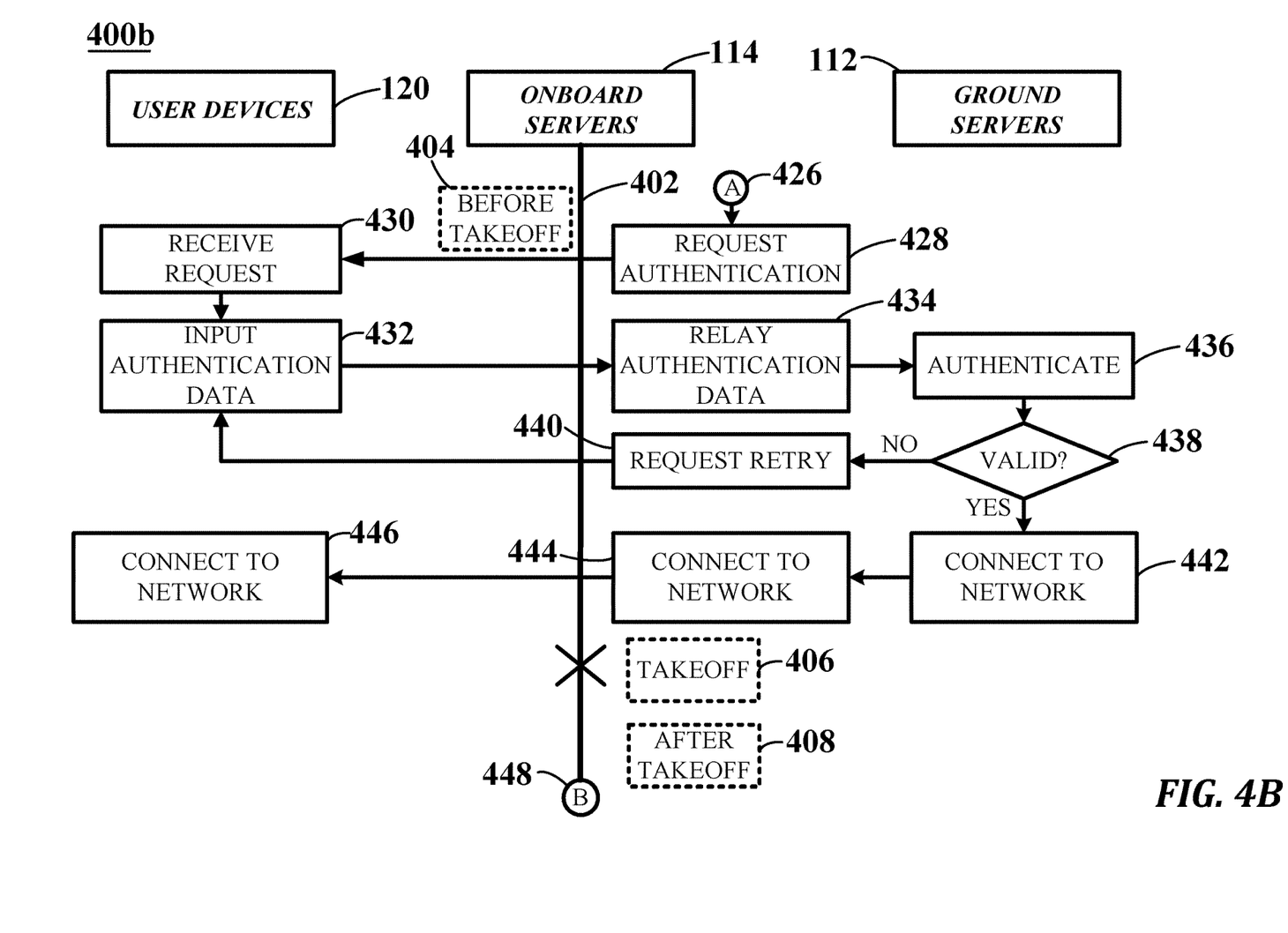
Figure 4C:
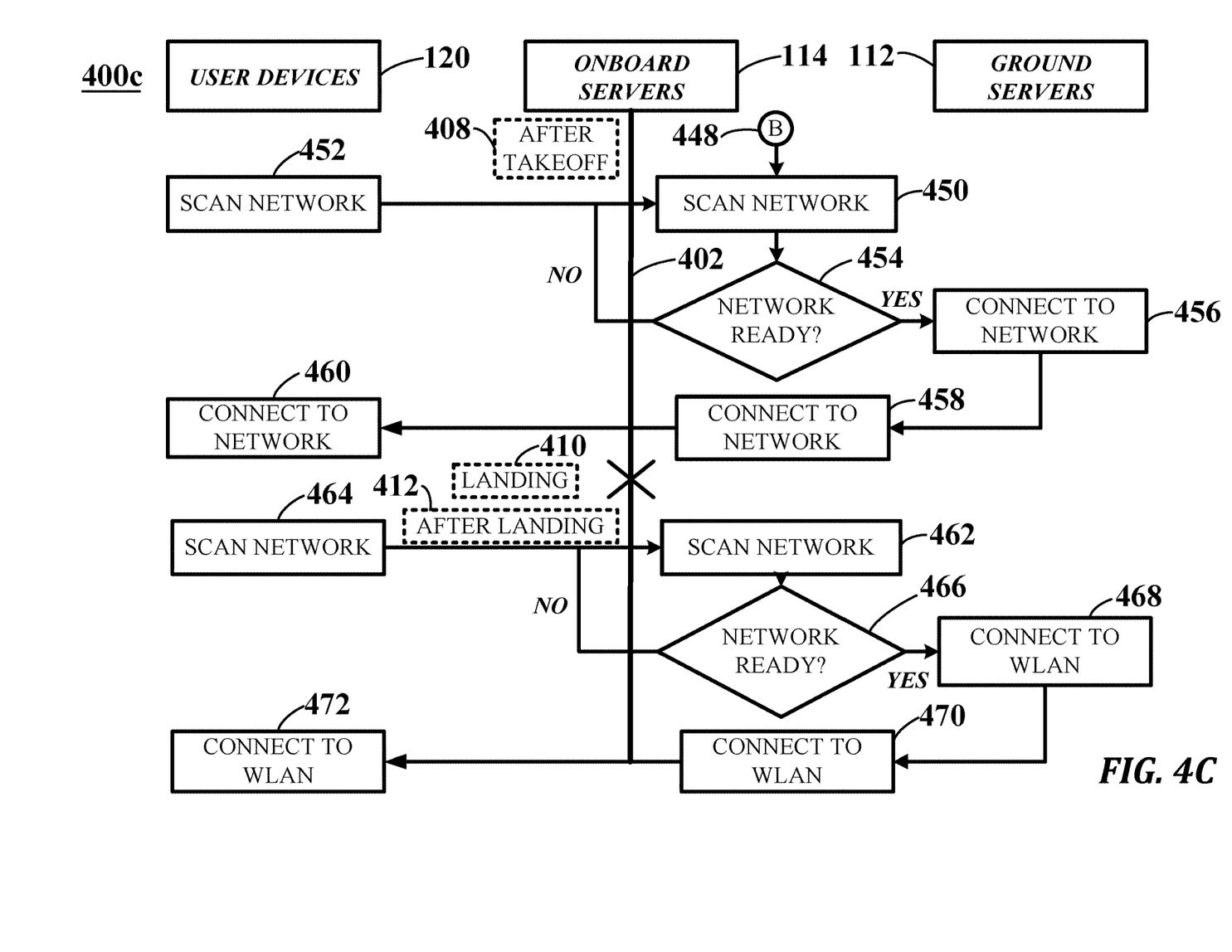

FIG. 4A-FIG. 4C depict a schematic illustration of a non-limiting example embodiment of a method represented by communication sequence diagrams 400a-c taking place between user devices 120 aboard an aircraft 104, onboard servers 114 and ground servers 112, according to various aspects of the present disclosure. Reference will be also made to elements of FIG. 1 and FIG. 3 to illustrate the communication sequence diagrams 400a-c. FIG. 4A—FIG. 4C comprise a timeline 402 that illustrates a sample flow of time that may be used in embodiments of the current disclosure, such as comprising sequence steps that may take place before takeoff 404 (as seen in FIG. 4A and FIG. 4B), during takeoff 406 (as seen in FIG. 4B), after takeoff 408 (as seen in FIG. 4B and FIG. 4C), and during landing 410 and after landing 412, as seen in FIG. 4C.

Making reference to FIG. 4A, the method represented in the communication sequence diagram 400a begins before takeoff 404 (e.g., when the aircraft 104 is on the terminal waiting for passengers to board) with step 414 by the onboard servers 114 scanning the network, such as from network signals that may be received from the one or more long-distance antennae 106 of FIG. 1. In parallel, previously or subsequently, the one or more user devices 120 may implement step 416 by requesting a network connection to the onboard network system 102 through the onboard servers 114 via, for example, a UI settings option 200 such as shown in FIG. 2, triggering the user devices 120 to scan the aircraft network, as viewed in step 418. Thus, even if an aircraft communications network 126 is not yet available for connection, the user devices 120 may periodically (e.g., at predetermined time intervals, such as every 30 or 60 seconds) continue the scan network step 418 until the aircraft communications network 126 is ready for connection. In some embodiments, after identifying the aircraft communications network 126, the user devices 120 may suspend signal transmissions from any other radiofrequency emitting function of the user devices 120 (e.g., call, SMS or data package exchange services), except for the identified onboard network system 102, which may be done through the same or a different UI settings option 200 as depicted in FIG. 2.

The method represented in the communication sequence diagram 400a may continue on check 420 by the onboard servers 114 determining whether the aircraft communications network 126 is ready for connection, in which case the ground servers 112 and onboard servers 114 may connect through a communications system 302, as viewed in step 422 to step 424, and in negative case the onboard servers 114 and user devices 120 may continue scanning the network in step 414 and step 418. The onboard servers 114 may determine whether the network is ready for connection through the connection rules module 304, which may be shared by the ground servers 112 with the onboard servers 114, as described with reference to FIG. 1 and FIG. 3.

The onboard servers 114 may continue in step 474 by notifying the users, through the user devices 120, about network connection readiness. The user devices 120 may receive the notification in step 476 and decide, in check 478, whether to approve or reject the connection. If the user rejects the connection, the method represented in the communication sequence diagram 400a may end, as represented by terminator 480. In case the user approves the connection, the user may send a connection approval confirmation to the onboard servers 114, which receive the confirmation, as viewed respectively in step 422 and step 424. The communication sequence diagram 400a may continue in connector A 426.

Making reference to FIG. 4B, the method represented in the communication sequence diagram 400b begins in connector A 426 and proceeds in step 428 by the onboard servers 114 requesting authentication to the user devices 120. The user devices 120 may receive the request in step 430 and input authentication data at step 432 as requested by the onboard servers 114. The onboard servers 114 may relay the authentication data to the ground servers 112, which may authenticate the one or more user devices 120, as viewed in step 434 and step 436. In some embodiments, the authentication process is performed through the authentication module 306 from the ground servers 112 shared with the onboard servers 114, which may compare, in check 438, the data provided by users with the stored user data. If the authentication data is invalid, the ground servers 112 may send a request retry to the user devices 120 through the onboard servers 114, as viewed in step 440, giving the users the opportunity to retry authentication by inputting the correct authentication data. If the authentication is valid, the ground servers 112 may connect the user device 120 to the aircraft communications network 126 through the onboard servers 114, as viewed in step 442 to step 446. At this point, users may exchange data with the ground servers 112 and communicate with a plurality of devices, including but not limited to a plurality of web servers through, for example, the Internet. In some embodiments, user authentication comprises one or more of inputting user login data, flight ticket scanning, finger print scanning, face scanning, or automatic secure user device profile creation and verification.

As viewed with reference to the timeline 402, during takeoff 406, network connection services may be automatically disconnected, as represented by the X symbol located on the timeline 402. The method illustrated in the communication sequence diagram 400b may continue after takeoff 408 at connector B 448.

Making reference to FIG. 4C, the method represented in the communication sequence diagram 400c begins in connector B 448 and proceeds in step 450 and step 452 by the onboard servers 114 and the user devices 120 respectively scanning the network. If the onboard servers 114 determine on check 454 that the aircraft communications network 126 is ready for connection, the ground servers 112, onboard servers 114 and user devices 120 may connect through the aircraft communications network 126, as viewed in step 456 to step 460, and in negative case the onboard servers 114 and user devices 120 may continue scanning the network in step 450 and step 452. After the initial authorization, the ground servers 112 may automatically perform the user-device authentication to grant access to the network connection without having to request user authentication data again.

As viewed with reference to the timeline 402, during landing 410, network connection services may be automatically disconnected, as represented by the X symbol located on the timeline 402. After landing 412, the onboard servers 114 and user devices 120 may continue scanning the network, as viewed in step 462 and step 464. If the onboard servers 114 determine on check 466 that the aircraft communications network 126 is ready for connection, the ground servers 112, onboard servers 114 and user devices 120 may connect through the aircraft communications network 126, as viewed in step 468 through step 472, and in negative case the onboard servers 114 and user devices 120 may continue scanning the network in step 462 and step 464.

Figure 5A:
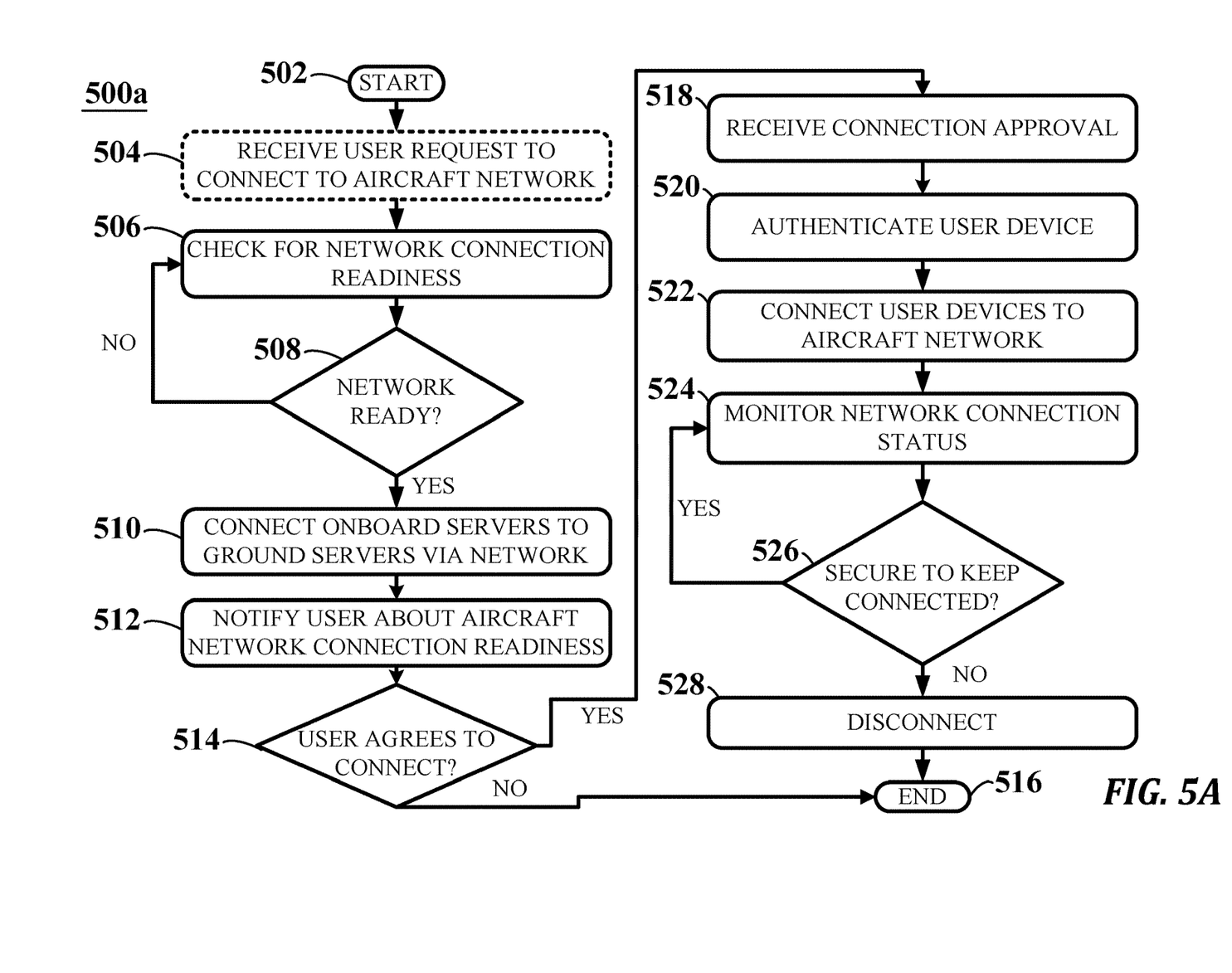
FIG. 5A and FIG. 5B depict a schematic illustration of a non-limiting example embodiment of a method 500*a*-500*b* for providing in-flight network communications, according to various aspects of the present disclosure.
Figure 5B:
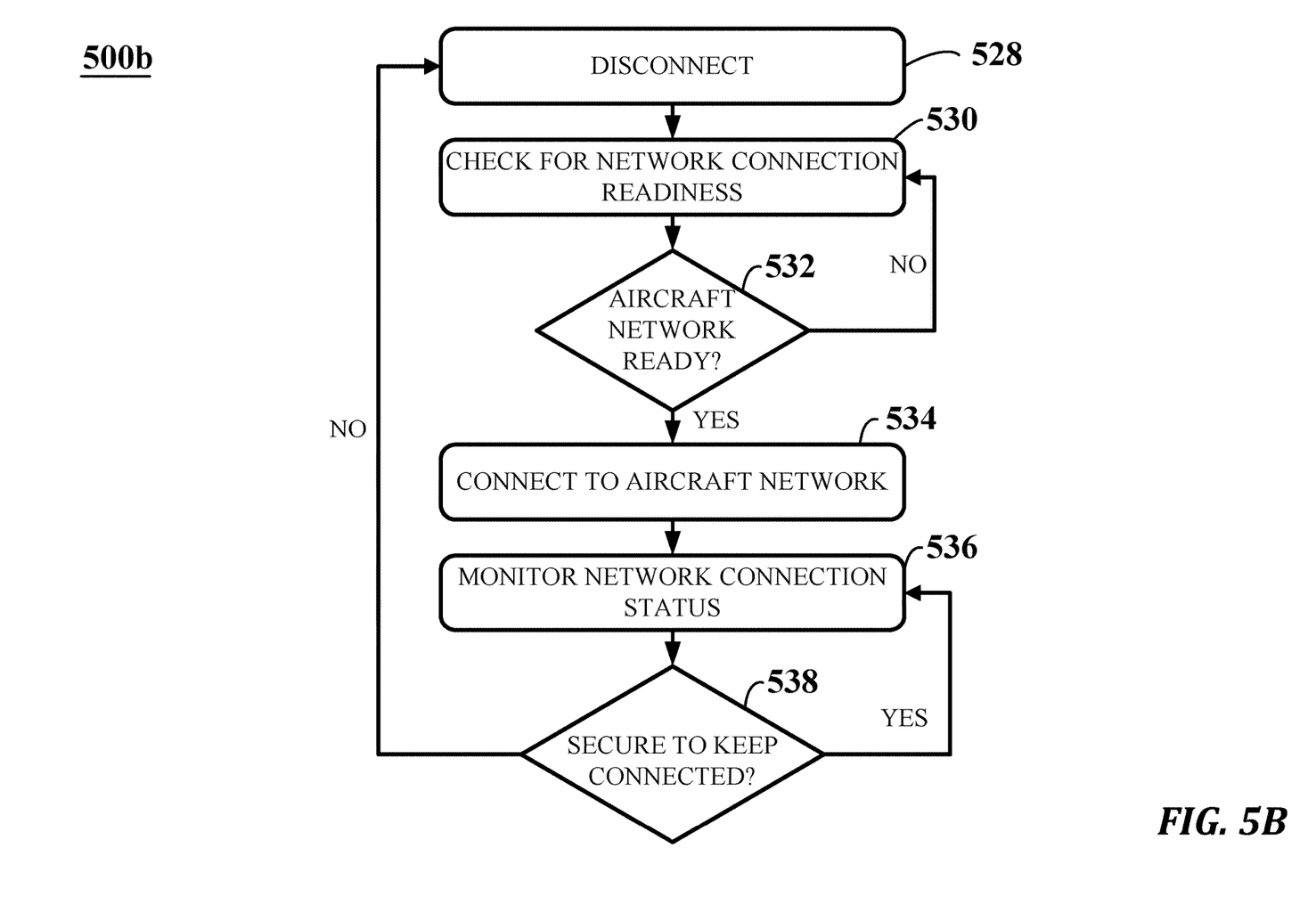

FIG. 5A and FIG. 5B depict a schematic illustration of a non-limiting example embodiment of a method 500a-500b for providing in-flight network communications, according to various aspects of the present disclosure. Method 500a-500b may be performed by an onboard server, such as onboard servers 114 of FIG. 1 and FIG. 4A—FIG. 4C. Transmission and reception of network signals to and from the onboard servers 114 may be enabled by one or more systems, such as the system 100 and system 300 illustrated with reference to FIG. 1 and FIG. 3.

Making reference to FIG. 5A, method 500a may start in terminator symbol 502 and proceed in step 506 by the onboard servers 114 checking for network connection readiness. In parallel, previously or subsequently, the onboard servers 114 may receive, in step 504 represented by a dotted block, a user request to connect to the aircraft network, prompting the user device 120 to scan the network until the onboard server 114 finds network connection readiness. In check 508, the onboard servers 114 may determine whether there is network connection readiness. If the network is not yet ready for connection, the onboard servers 114 may continue checking for network connection readiness. In the meantime, the user devices 120 onboard the aircraft 104 may simultaneously scan for the aircraft network. If the network is ready for connection, the method 500a continues in step 510 by connecting the onboard servers 114 to the ground servers 112 via a communications system 302 (e.g., through communications systems 302 such as satellite communications system 108 and/or air-to-ground communications system 110).

In step 512, method 500a continues by the onboard servers 114 notifying the user about aircraft network connection readiness and asking whether the user approves connection. In check 514, the onboard server 114 determines whether the user agrees or rejects the connection. If the user rejects the connection, the method 500a may end, as viewed in terminator 516. If the user approves the connection, the method 500a may continue by the onboard servers 114 receiving connection approval, as viewed in step 518, which may be relayed to the ground servers 112. In step 520, the onboard servers 114 may proceed by authenticating the user devices 120. Said authentication may be performed by the user devices 120 inputting authentication data that is sent, via the onboard servers 114, to an authentication module 306 of the ground servers 112, which may compare the authentication data with the stored data to validate the authentication.

In step 522, after authentication has been successful, the onboard servers 114 and corresponding user devices 120 may connect to the ground server 112 via the communications system 302. The onboard servers 114 continue in step 524 by monitoring the network connection status based on connection rules (e.g., from the connection rules module 304 of FIG. 3). In check 526, the method 500a may determine whether it is secure to keep connected based on one or more connection rules. In the positive case, the onboard servers 114 may continue monitoring the network connection status in step 524. However, in the negative case, the onboard servers 114 may disconnect from the network, as viewed in step 528, after which the method 500a may end in terminator 516. For example, during takeoff and landing, or based on predetermined speed, air pressure, altitude or location thresholds, the onboard servers 114 may disconnect from the network, disconnecting simultaneously the user devices 120.

Making reference to FIG. 5B, method 500b may continue in step 528 by disconnecting the onboard servers 114 from the aircraft communications network 126. In step 530, the method 500b may continue by checking for network connection readiness. In check 532, the method 500b may determine whether the aircraft network is ready. In negative case, the method 500b may return to step 530 by continuing to check for network connection readiness. If the aircraft network is ready, the method 500b may continue by connecting the onboard servers 114 to the aircraft communications network 126 at step 534. In step 536, the onboard servers 114 monitor the network connection status. In check 538, the method 500b determines whether it is secure to keep connected. In negative case, the onboard servers 114 disconnect from the network by the method 500b going back to step 528. In positive case, the onboard servers 114 keep monitoring the network connection status in step 536.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for providing aircraft network communications comprising:
   checking, by an onboard server of an aircraft, for aircraft network connection readiness;
   receiving, by the onboard server, a connection request from one or more user devices on the aircraft that subsequently and periodically continue scanning for aircraft network connection readiness;
   in response to finding, by the onboard server, a secure connection to an aircraft communications network based on one or more connection rules:
      connecting the onboard server to the aircraft communications network by using one or more long-distance antennas to communicate with one or more ground servers via a satellite communications system or an air-to-ground communications system;
      notifying the one or more user devices that a network is available;
      receiving connection approval from the one or more user devices;
      authenticating the one or more user devices;
      connecting the one or more user devices to the aircraft network;
      monitoring network connection status; and
      in response to determining that the network connection status is insecure based on the one or more connection rules, disconnecting the onboard server from the aircraft communications network.

2. The method of claim 1, further comprising, after disconnecting the onboard server from the aircraft communications network:
   checking for network connection readiness;
   in response to again finding a secure connection to the aircraft communications network based on the one or more connection rules, connecting the onboard server and one or more user devices to the aircraft communications network;
   continuing monitoring status of the connection to the aircraft communications network; and
   in response to determining that the network connection status is again insecure based on the one or more connection rules, disconnecting the onboard server from the aircraft communications network again.

3. The method of claim 1, wherein the one or more connection rules include at least one of a speed threshold, an altitude threshold, an air pressure threshold, and a location threshold measured by corresponding sensing devices.

4. The method of claim 3, wherein the one or more connection rules cause the onboard server to initially connect to the aircraft communications network before takeoff to enable a corresponding connection of the one or more user devices to the aircraft communications network, and to disconnect from the aircraft communications network during takeoff and landing.

5. The method of claim 1, further comprising creating a user profile associated with an airline of the aircraft, and storing the user profile in the one or more ground servers for authentication purposes.

6. The method of claim 5, wherein connecting the one or more user devices to the aircraft communications network includes allocating an amount of bandwidth to the one or more user devices based on corresponding user profiles.

7. The method of claim 5, wherein creating the user profile includes one or more of inputting user login data, flight ticket scanning, finger print scanning, face scanning, and automatic secure user device profile creation and verification.

8. The method of claim 7, wherein a digital version of a flight ticket is stored in a digital wallet, and wherein the one or more ground servers check the digital version of the flight ticket to grant network connection access.

9. The method of claim 5, wherein creating the user profile includes automatic secure user device profile creation, and wherein the automatic secure user device profile creation includes using, by the one or more ground servers, identifying information of the user device, wherein the identifying information of the user device includes one or more of subscriber identity module (SIM) information, a mobile equipment identifier (MEID), and an International Mobile Equipment Identity (IMEI).

10. The method of claim 1, wherein receiving the connection request from the one or more user devices on the aircraft includes receiving a request for suspending radio-frequency signal transmission by the user device except for communication with the aircraft network.

11. The method of claim 10, wherein the connection request and the request for suspending radio-frequency signal transmission is sent by the use of a standard configuration option installed by default on the one or more user devices.

12. The method of claim 10, wherein the connection request and the request for suspending radio-frequency signal transmission is sent by a downloadable application installed on the one or more user devices.

13. An onboard network system installed on an aircraft for providing aircraft network communications, the onboard network system comprising:
one or more onboard antennas;
an onboard server; and
one or more networking devices;
wherein the onboard server is configured to perform actions comprising:
checking for aircraft network connection readiness;
receiving a connection request from one or more user devices on the aircraft through the one or more networking devices, the one or more user devices subsequently and periodically continuing the scanning of aircraft network connection readiness;
in response to detecting that a connection to an aircraft network is ready:
connecting the onboard server to a communication system;
authenticating the one or more user devices; and
connecting the one or more user devices to an aircraft communications network via the communication system; and
in response to detecting that a network status of the aircraft network is insecure, disconnecting from the aircraft communications network.

14. The system of claim 13 wherein the actions further comprise, after disconnecting from the aircraft communications network:
again checking for network connection readiness;
in response to determining that the aircraft network is again ready for connection:
connecting the onboard server and the one or more user devices to the aircraft communications network;
continuing to monitor the network status; and
in response to detecting that the network status is again insecure, disconnecting again from the aircraft communications network.

15. The system of claim 13, wherein checking for aircraft network connection readiness is performed based on one or more connection rules comprising at least one of a speed threshold, an altitude threshold, or a location threshold measured by corresponding sensing devices.

16. The system of claim 15, wherein the actions further comprise, based on the one or more connection rules, initially connecting to one or more ground servers before takeoff to enable a corresponding connection of the one or more user devices to the aircraft communications network, and subsequently disconnecting from the one or more ground servers during takeoff and landing.

17. The system of claim 13, wherein the actions further comprise creating a user profile associated with an airline of the aircraft, and storing the user profile in one or more ground servers for authentication purposes.

18. The system of claim 17, wherein creating the user profile comprises one or more of inputting user login data, flight ticket scanning, finger print scanning, face scanning, or automatic secure user device profile creation and verification.

19. The system of claim 17, wherein creating the user profile includes automatic secure user device profile creation, and wherein the secure user device profile creation includes using, by the one or more ground servers, identifying information of the user device, wherein the identifying information of the user device includes one or more of subscriber identity module (SIM) information, a mobile equipment identifier (MEID), and an International Mobile Equipment Identity (IMEI).

20. The system of claim 13, wherein receiving the connection request from the one or more user devices on the aircraft includes receiving a request for suspending radio-frequency signal transmission by the user device except for communication with the onboard network system.

* * * * *